(12) United States Patent
Lafata et al.

(10) Patent No.: US 8,219,149 B2
(45) Date of Patent: Jul. 10, 2012

(54) MOBILE COMMUNICATION TERMINAL

(75) Inventors: Paul Lafata, San Diego, CA (US); Akseli Anttila, Helsinki (FI); Harri Wikberg, Helsinki (FI); Kirsi Karimaki, Tampere (FI); Imre Kiss, Tampere (FI)

(73) Assignee: Nokia Corporation, Espoo (FI)

( * ) Notice: Subject to any disclaimer, the term of this patent is extended or adjusted under 35 U.S.C. 154(b) by 1049 days.

(21) Appl. No.: 11/170,784

(22) Filed: Jun. 29, 2005

(65) Prior Publication Data

US 2007/0004462 A1 Jan. 4, 2007

(51) Int. Cl.
*H04M 1/00* (2006.01)
*H04B 1/38* (2006.01)

(52) U.S. Cl. ...................................... 455/563

(58) Field of Classification Search .................. 455/563, 455/412.1, 412.2, 414.1, 67.7, 79, 116, 414.4, 455/511

See application file for complete search history.

(56) References Cited

U.S. PATENT DOCUMENTS

| 6,898,283 | B2 | 5/2005 | Wycherley et al. ....... 379/433.11 |
| 6,964,012 | B1 * | 11/2005 | Zirngibl et al. ................ 715/201 |
| 7,657,289 | B1 * | 2/2010 | Levy et al. ..................... 455/563 |
| 2003/0017848 | A1 * | 1/2003 | Engstrom et al. ............. 455/558 |
| 2004/0123281 | A1 | 6/2004 | Olrik et al. ..................... 717/168 |
| 2005/0085272 | A1 | 4/2005 | Andersson et al. ........... 455/566 |

FOREIGN PATENT DOCUMENTS

| EP | 1 513 330 A1 | 3/2005 |
| WO | WO 2005/002187 A1 | 1/2005 |
| WO | WO 2005/039160 A1 | 4/2005 |

* cited by examiner

*Primary Examiner* — Eugene Yun
(74) *Attorney, Agent, or Firm* — Alston & Bird LLP

(57) ABSTRACT

A mobile communication apparatus capable of presenting themes, a telecommunication system comprising a such apparatus, and a corresponding method are disclosed. The apparatus comprises a processor arranged to generate an audio signal in response to a set theme. The audio signal comprises a speech signal, wherein speech of the speech signal have voice characteristics which depend on the theme. Alternatively, processor is arranged to set a theme in response to contact information stored in a contact information database of the appatatus and associated with actions performed by the apparatus.

13 Claims, 4 Drawing Sheets

MOBILE COMMUNICATION TERMINAL

TECHNICAL FIELD

The present invention relates to mobile communication apparatuses, telecommunication systems, and corresponding methods.

BACKGROUND OF THE INVENTION

Mobile communication apparatuses are widely used, and many users prefer to be able to customize the behaviour of their mobile communication apparatus. A feasible way to do this is to use themes. A theme in a mobile communication apparatus is a feature used to provide a preferred appearance to a user interface layout. A theme can affect characteristics of a layout, background color, fill and border characteristics of a field, as well as text attributes for labels and/or text. A mobile communication apparatus capable of presenting themes normally provides a set of themes which the user can select according to her preferences at the moment. However, there is always a demand for new features in mobile communication apparatuses. Therefore, there is a need for an improved ability for customization of mobile communication apparatuses.

SUMMARY OF THE INVENTION

In view of the above, an objective of the invention is to solve or at least reduce the problems discussed above. In particular, an objective is to enhance features related to themes in a mobile communication apparatus.

The present invention is based on the understanding that technical progress within signal processing can be used for improving customization of a mobile communication apparatus.

According to a first aspect of the present invention there is provided a mobile communication apparatus capable of presenting themes. The apparatus comprises a processor arranged to generate an audio signal in response to a set theme. The audio signal comprises a speech signal, wherein speech of the speech signal have voice characteristics which depend on the theme.

An advantage of this is that customization by themes is extended to audio domain, and that speech, and voice characteristics of the speech, is utilized, which implies the further advantage of improved communication between the mobile communication apparatus and the user, since voice characteristics are directly related to the user's experience of mobile communication apparatus behaviour; the apparatus acts like a fellow to the user.

The processor may comprise a text to speech convertor, and/or may comprise a voice manipulator for generating the audio signal. The audio signal may be output by a user interface of the apparatus, and/or sent by a transceiver of the apparatus. The audio signal may be generated from a text, received in a message comprising the text, by a text to speech generator.

Advantages of these features are that voice characteristics can be applied to text and/or voice information, and communicated to the user and/or partner in conversation.

The theme may be settable by a user, an application, a received message, a contact, and/or a timing signal.

An advantage of this is improved management of themes.

According to a second aspect of the present invention there is provided a telecommunication system comprising a network, a plurality of network nodes of the network, and at least one mobile communication apparatus according to the first aspect of the invention being in wireless communication with one or more of the network nodes.

Advantages of these features are similar to those of the first aspect of the present invention.

The network may provide characteristics of a theme, which the apparatus may be arranged to receive from the network.

An advantage of this is provision of themes from the network, which may further improve theme management for the user.

According to a third aspect of the present invention there is provided a method for generating a speech signal in a mobile communication apparatus, comprising the steps of setting a theme; setting voice characteristics associated with the theme; and generating an audio signal comprising a speech signal, wherein speech of the speech signal has the set voice characteristics. The step of generating the audio signal may comprise the step of converting a text to the speech signal, and/or comprise the step of manipulating a voice to generate the speech signal. The method may further comprise the step of sending the generated audio signal over a communication channel, and/or outputting the generated audio signal via a user interface of the apparatus. The method may further comprise the steps of receiving a message comprising a text over a communication channel, and converting the text to speech to generate the speech signal from the text.

Advantages of these features are similar to those of the first aspect of the present invention.

According to a fourth aspect of the present invention there is provided a mobile communication apparatus capable of presenting themes. The mobile communication apparatus comprises a processor arranged to set a theme in response to contact information stored in a contact information database of the appatatus and associated with actions performed by the apparatus.

An advantage of this is that the theme can be changed according to the person the user is in contact with or at least may have in mind, since actions are performed that are associated with contact information of that person.

The processor may further be arranged to generate an audio signal in response to the theme, wherein the audio signal may have characteristics which depend on the theme.

An advantage of this is provision of audio related themes in response to accessed contact information.

The processor may be arranged to generate a message including the audio signal and/or characteristics of the theme. The audio signal may be output by a user interface of the apparatus. The apparatus may comprise a transceiver arranged to send the audio signal over a communication channel, and/or arranged to receive a message comprising a text over the communication channel, wherein the processor may comprise a text to speech converter arranged to generate a speech signal from the text, wherein the speech signal may be comprised in the audio signal.

According to a fifth aspect of the present invention there is provided a telecommunication system comprising a network, a plurality of network nodes of the network, and at least one mobile communication apparatus according to the fourth aspect of the present invention being in wireless communication with one or more of the network nodes when in use. The network may be arranged to provide characteristics of the theme, and the apparatus may be arranged to receive the characteristics of the theme from the network.

According to a sixth aspect of the present invention there is provided a method for generating an audio signal in a mobile communication apparatus, comprising the steps of performing an action related to contact information stored in a contact information database of the apparatus; setting a theme in response to the contact information; setting audio signal characteristics associated with the theme; and generating an audio signal having the audio signal characteristics. The method may further comprise the step of sending the audio signal over a communication channel.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

Other objectives, features and advantages of the present invention will appear from the following detailed disclosure, from the attached dependent claims as well as from the drawings.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

DETAILED DESCRIPTION OF PREFERRED EMBODIMENTS

Figure 1:
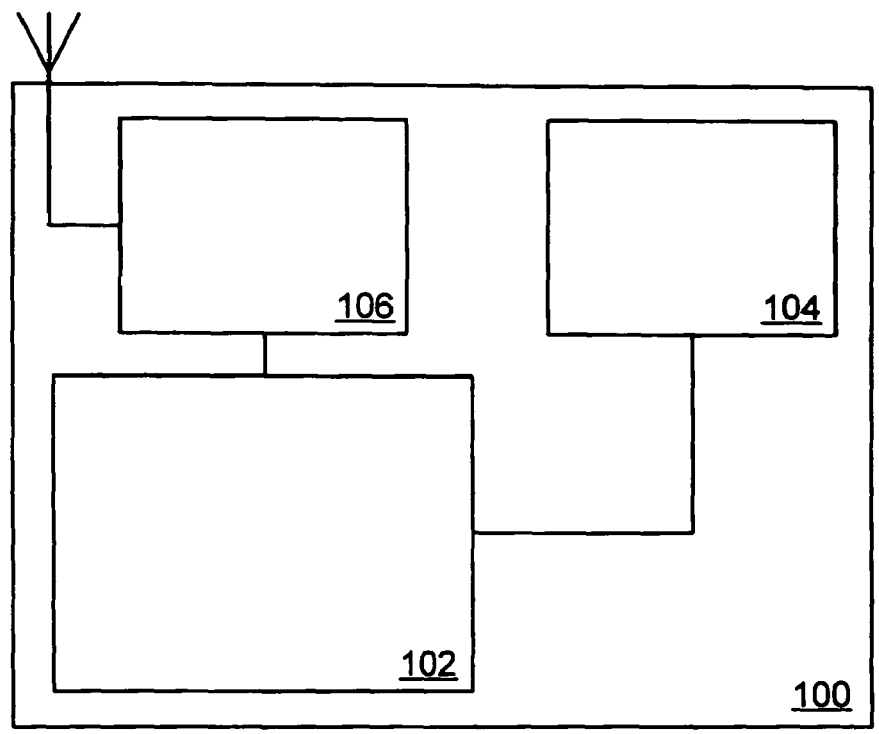
FIG. 1 is a schematic block diagram of a mobile communication apparatus according to an embodiment of the present invention.

FIG. 1 is a schematic block diagram of a mobile communication apparatus 100 according to an embodiment of the present invention. The mobile communication apparatus comprises a processor 102, a user interface 104, and a transceiver 106. The user interface 104 and the transceiver 106 are connected to and controlled by the processor 102. The processor is arranged to perform, in conjunction with the user interface 104 and the transceiver 106, a plurality of functions, which are normally performed in a mobile communication apparatus. However, to not obstruct the special features of the present invention, description of these normally performed functions are omitted in this disclosure.

The mobile communication apparatus is capable of presenting themes. A theme in a mobile communication apparatus is a feature used to provide a preferred appearance to a user interface layout. A theme can affect characteristics of a layout, background color, fill and border characteristics of a field, as well as text attributes for labels and/or text. A mobile communication apparatus capable of presenting themes normally provides a set of themes which the user can select according to her preferences at the moment. However, in the present invention the layout of the user interface according to the themes is extended to the audio domain, as will be described below.

The processor 102 is arranged to generate an audio signal in response to a theme, which can be set directly by a user, or by an application executed on the apparatus. Further, the theme can be set by a received message comprising information about which theme to set, or the entire characteristics of a new theme to be set. The theme can also be set in correspondence to a contact associated with an action performed by the apparatus, e.g. a contact accessed by the user in a contact database (not shown) of the apparatus 100, e.g. a phone book, or an incoming or outgoing phone call or message from/to a person associated with an item in the contact database.

The audio signal can comprise a speech signal, which can be generated by text to speech conversion or by voice manipulation, which is performed by the processor 102. The theme includes voice characteristics for speech of the speech signal. For example, when a certain person associated with a contact item calls, a certain theme is set, which comprises voice characteristics, e.g. the particular characteristics of a cartoon character, wherein the name in the contact database is output through text to speech conversion and with a "cartoon voice", and then can either incoming or outgoing speech signal, or both, of the phone conversation be voice manipulated to sound like the cartoon voice. Another example is a received text message from a person associated with a contact item associated with a theme comprising the voice characteristics of a science fiction character, wherein the text message is converted to speech with the science fiction voice characteristics, and the message is output as speech through the user interface 104. Any combination of the above described features can be set in the themes. According to an embodiment of the present invention, it is also possible to send the audio signal and/or the theme to another subscriber, or to a server in a telecommunication network. For example, a text message to be sent or received can comprise a tag related to text to speech by certain voice characteristics, such that a given voice style can be reproduced. Also other audio features than speech and voice styles can be employed within the audio theme concept, and theme management depending on other parameters. A theme can be activated by a timing signal, e.g. provided by a clock or calendar in the apparatus. For example, when a call is performed when the calendar indicates out of office or vacation, the sound of seagulls and waves can be introduced as a background sound, or when a message is received, comprising a tag indicating that the sending person is in a meeting, a huge sigh is played. The concept of themes tied to association with a contact item is here described in relation to themes comprising audio. However, the concept of themes tied to association with a contact item can be utilized for any theme, e.g. presenting visual effects, background colors or images, adapting applications, etc., when reading messages from a particular contact, viewing calendar events which includes the contact, playing games with the contact, talking to the contact, chatting with the contact, etc.

Figure 2:
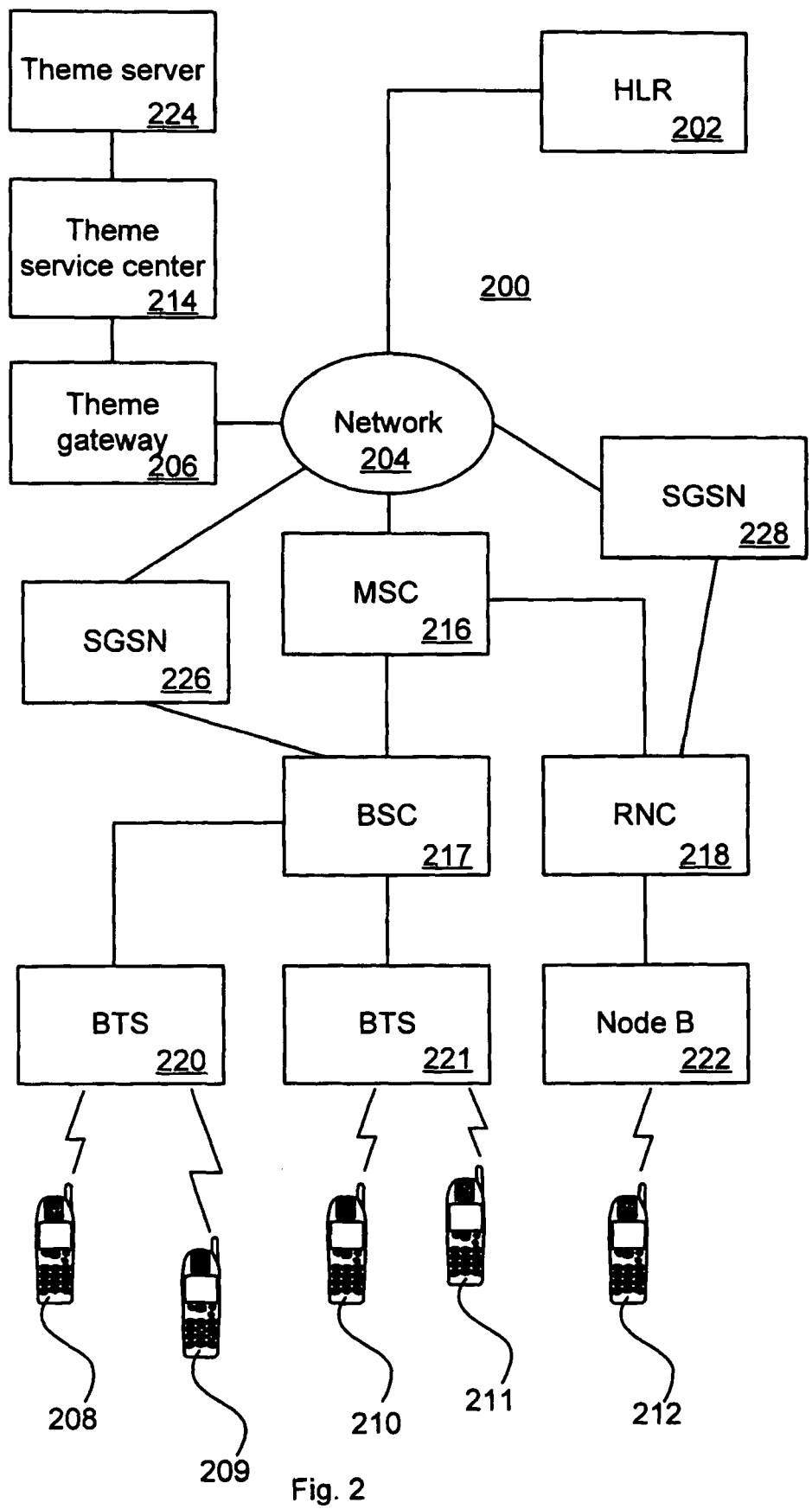
FIG. 2 shows a telecommunication system according to an embodiment of the present invention.

A system architecture for managing a system 200 according to an embodiment of the present invention is shown in FIG. 2. A Home Location Register (HLR) 202 contains a database (not shown) including relevant subscriber information for provision of telecommunication service. A CCITT specified network 204 interconnects the individual parts of the system 200. A theme gateway 206 is a switching unit routing a theme message to a mobile communication apparatus 208-212. A Theme Service Center 214 (TSC) and the theme gateway 206 handles and routes the theme messages between the TSC 214 and the network 204. From the network 204, the theme messages are routed to the mobile communication apparatuses 208-212 via a Mobile Switching. Center (MSC) 216 to a Base Station Controller (BSC) 217 and a Base Transceiver Station (BTS) 220, 221, or a Radio Network Controller (RNC) 218 and a Node B 222. Alternatively, the theme messages are routed to the mobile communication apparatuses 208-212 via a Serving GPRS Support Node (SGSN) 226, 228 to the BSC 217 and the BTS 220, 221, or the RNC 218 and the Node B 222, respectively. The BTS 220, 221 or the Node B 222 establish the air connection to the mobile communication apparatuses 208-212.

According to an embodiment of the present invention, a network operator or other third party company handling a theme server 224 could offer a theme provision function. For example a network operator may have a theme server 224 supporting a feature where the theme provider may provide themes and the users may send a theme request from their mobile communication apparatuses 208-22 to the theme server 224. This theme server 224 automatically may place people sending a similar request to the theme server 224 into "theme groups" or "theme rooms". Further, themes in the theme server can be created or edited by any of the users of the theme group or members of the theme room according to a special service, where a user or member send a message comprising theme characteristics to the theme server 224.

Figure 3:
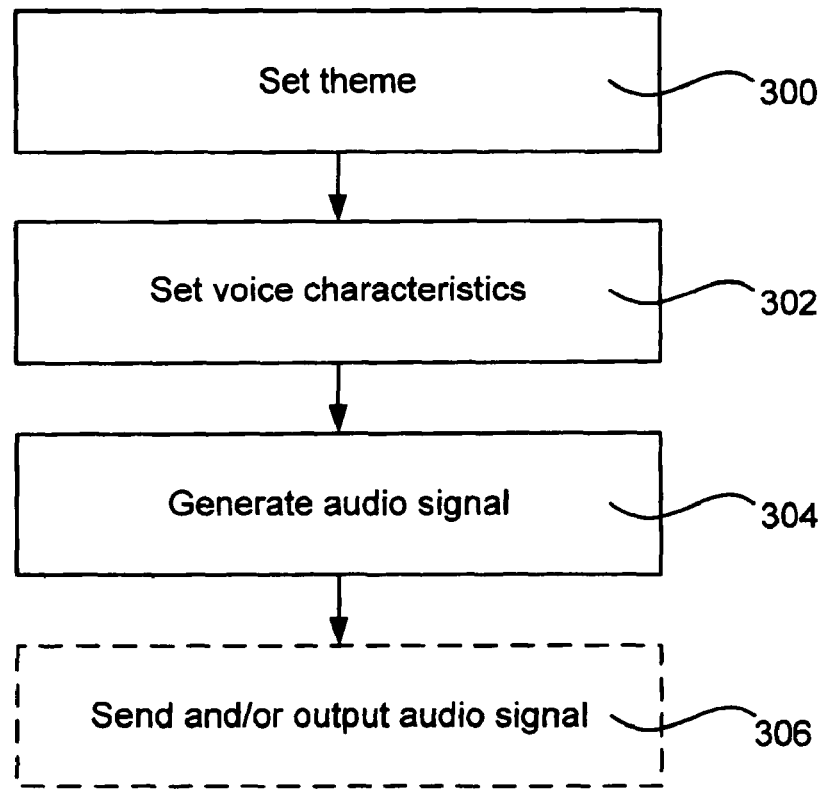
FIG. 3 is a flow chart of a method according to an embodiment of the present invention.

FIG. 3 is a flow chart illustrating a method according to an embodiment of the present invention for generating a speech signal in a mobile communication apparatus. In a theme setting step 300, a theme is set. The theme is set by a user, an application, a received message, a contact, or a timing signal, or any combination thereof. In a voice characteristics setting step 302, voice characteristics associated with the set theme is set. Then, in an audio signal generating step 304, an audio signal comprising a speech signal is generated, wherein the speech of the speech signal is adapted according to the set voice characteristics optionally, in a send/output step 306, the audio signal is either sent over a communication channel via a telecommunication network, or output by a user interface of the mobile communication apparatus, or both.

Figure 4:
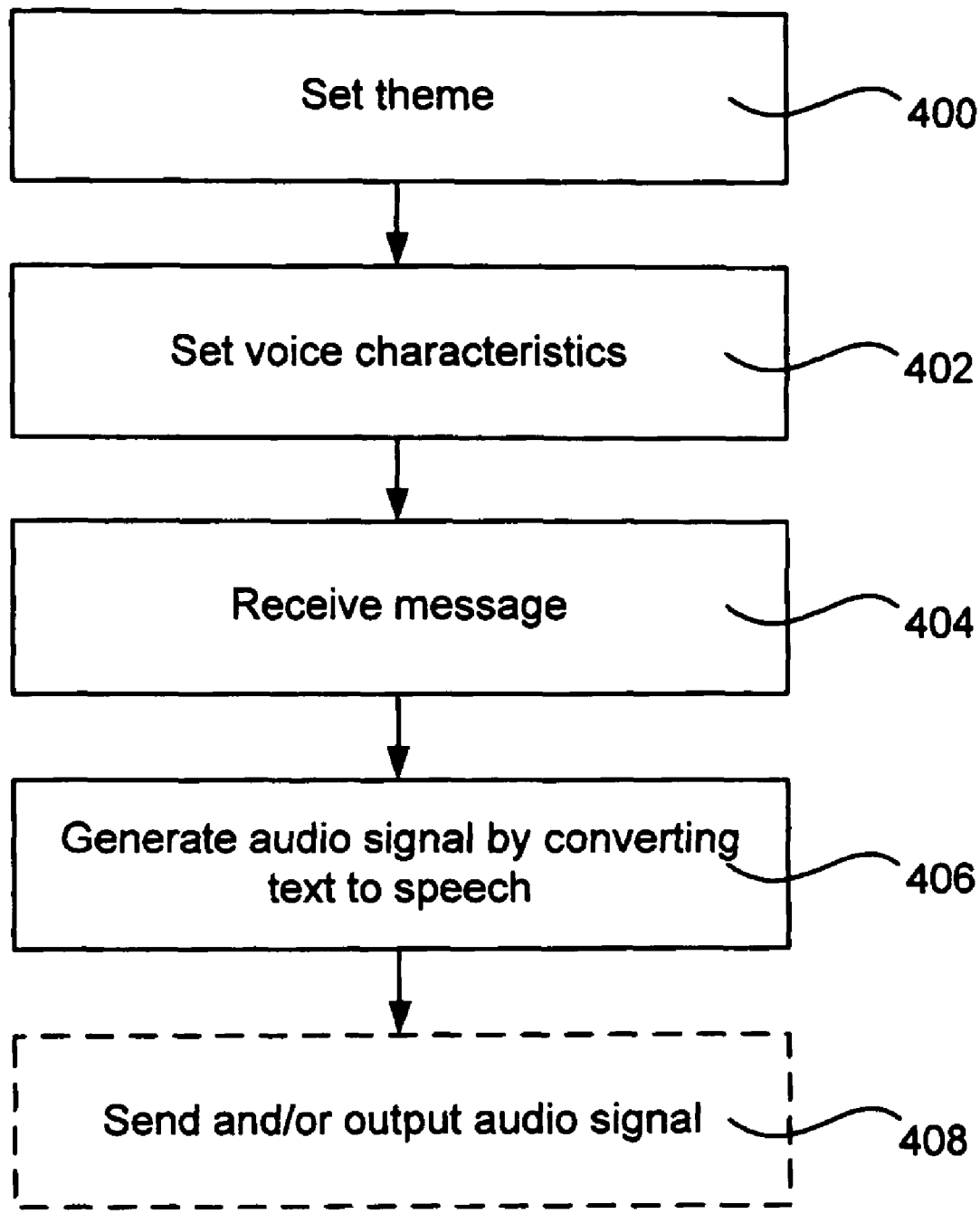
FIG. 4 is a flow chart of a method according to an embodiment of the present invention.

FIG. 4 is a flow chart illustrating a method according to an embodiment of the present invention for generating a speech signal in a mobile communication apparatus. In a theme setting step 400, a theme is set. The theme is set by a user, an application, a received message, a contact, or a timing signal, or any combination thereof. In a voice characteristics setting step 402, voice characteristics associated with the set theme is set. A message comprising text is received in a message reception step 404. Then, in an audio signal generating step 406, an audio signal comprising a speech signal is generated by conversion of the text from the message to the speech signal, wherein the speech of the speech signal is adapted according to the set voice characteristics. Optionally, in a send/output step 408, the audio signal is either sent over a communication channel via a telecommunication network, or output by a user interface of the mobile communication apparatus, or both.

Figure 5:
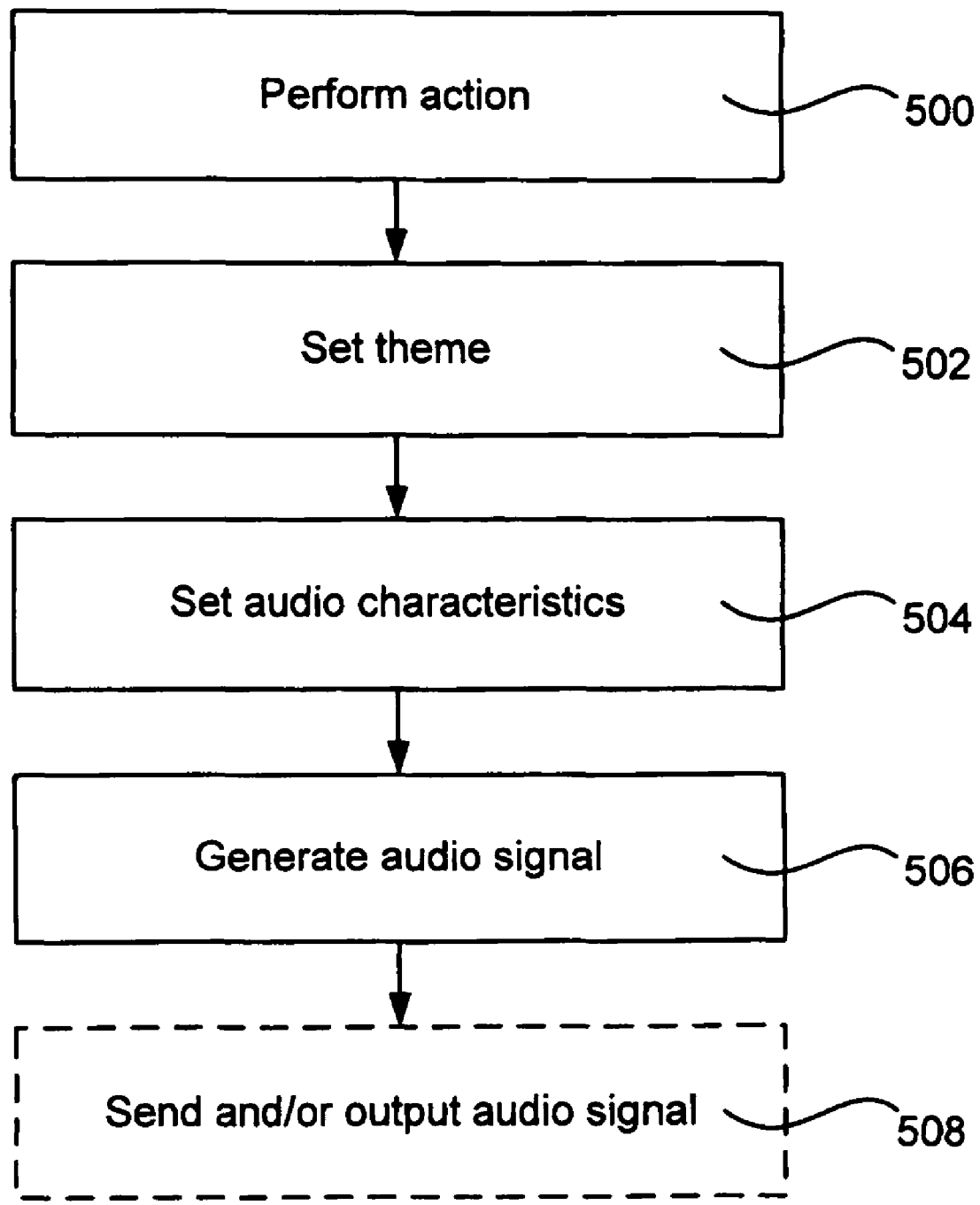
FIG. 5 is a flow chart of a method according to an embodiment of the present invention.

FIG. 5 is a flow chart illustrating a method according to an embodiment of the present invention for generating an audio signal in a mobile communication apparatus. From an action performing step 500, it is determined an associated contact item in a contact database of the apparatus. In a theme setting step 502, a theme is set according to information about themes in the associated contact item. In an audio characteristics setting step 504, audio characteristics associated with the set theme is set. Then, in an audio signal generating step 506, an audio signal comprising is generated, wherein an audio signal is adapted according to the set audio characteristics. Optionally, in a send/output step 508, the audio signal is either sent over a communication channel via a telecommunication network, or output by a user interface of the mobile communication apparatus, or both.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A mobile communication apparatus comprising:
a user interface; and
a processor coupled to the user interface, the processor being configured to receive characteristics of at least one theme wirelessly from a network of a telecommunication system;
said processor configured to present themes on the user interface, wherein a presented theme provides an appearance of a layout of the user interface in accordance with said characteristics;
said processor comprising at least one of a text to speech converter and a voice manipulator, said at least one of a text to speech converter and voice manipulator; being configured to generate an audio signal in response to said presented theme in accordance with said characteristics, wherein said audio signal comprises a speech signal, wherein speech of said speech signal has voice characteristics which depend on said presented theme.

2. The mobile communication apparatus according to claim 1, wherein said voice manipulator is arranged to generate said speech signal from an input speech signal.

3. The mobile communication apparatus according to claim 1, further comprising a user interface controlled by said processor, wherein said user interface is arranged to output said audio signal.

4. The mobile communication apparatus according to claim 1, further comprising a transceiver controlled by said processor, wherein said transceiver is arranged to send said audio signal over a communication channel.

5. The mobile communication apparatus according to claim 1, further comprising a transceiver controlled by said processor, wherein said transceiver is arranged to receive a message comprising a text over a communication channel, wherein said processor comprises a text to speech convertor arranged to generate said speech signal from said text.

6. The mobile communication apparatus according to claim 1, wherein said theme is settable by a user, an application, a received message, a contact, or a timing signal, or any combination thereof.

7. The mobile communication apparatus according to claim 1 wherein the set theme is one or more of a characteristic of the layout of the user interface, a background color of the user interface or a border characteristic of the user interface.

8. The mobile communication apparatus according to claim 1, wherein the theme is settable by a received message.

9. A telecommunication system comprising a network, a plurality of network nodes of said network, and at least one mobile communication apparatus being in wireless communication with one or more of said network nodes when in use, wherein said mobile communication apparatus comprises a processor and is capable of presenting themes on a user interface of the at least one mobile communications apparatus, said processor being configured to receive characteristics of at least one theme wirelessly from said network, a presented theme providing an appearance of a layout of the user interface in accordance with said characteristics, wherein said processor comprises at least one of a text to speech converter and a voice manipulator, wherein said at least one of a text to speech converter and voice manipulator is arranged to generate an audio signal in response to the presented theme.

10. The telecommunication system according to claim 9, wherein said network is arranged to provide characteristics of said theme, and said mobile communication apparatus is arranged to receive said characteristics of said theme from said network.

11. A method comprising:

receiving characteristics of at least one theme wirelessly;

setting a theme for a user interface of a mobile communication apparatus in accordance with said characteristics, the set theme providing an appearance of a layout of the user interface;

setting voice characteristics associated with said set theme; and generating, at the mobile communication apparatus, an audio signal comprising a speech signal, the audio signal being generated by one of a text-to-speech converter or a voice manipulator, wherein speech of said speech signal has said voice characteristics, wherein generating said audio speech signal comprises adapting said speech signal to have said voice characteristics by at least one of converting a text to said speech signal and manipulating a voice to generate said speech signal.

12. The method according to claim 11, further comprising sending said audio signal over a communication channel.

13. The method according to claim 11, further comprising the steps of receiving a message comprising a text over a communication channel; and converting said text to speech to generate said speech signal from said text.

* * * * *